United States Patent [19]
Thiessen et al.

[11] 3,743,840
[45] July 3, 1973

[54] BIFILAR HELICAL MULTIWIRE PROPORTIONAL CHAMBER

[75] Inventors: Henry A. Thiessen, Los Alamos, N. Mex.; Stanley Sobottka, Charlottesville, Va.; David M. Lee, Los Alamos, N. Mex.

[73] Assignee: The United States of America as represented by the United States Atomic Energy Commission, Washington, D.C.

[22] Filed: July 18, 1972

[21] Appl. No.: 273,001

[52] U.S. Cl. .......................................... 250/336
[51] Int. Cl. .................................... G01t 1/18
[58] Field of Search ............................. 250/83.6 R

[56] References Cited
UNITED STATES PATENTS

| | | | |
|---|---|---|---|
| 3,694,655 | 9/1972 | Auer | 250/83.6 R |
| 3,359,421 | 12/1967 | Perez-Mendez et al. | 250/83.6 R |
| 3,614,443 | 10/1971 | Hesselbo | 250/83.6 R |
| 2,532,956 | 12/1950 | Simpson | 250/83.6 R |

Primary Examiner—James W. Lawrence
Assistant Examiner—Harold A. Dixon
Attorney—Ronald A. Anderson

[57] ABSTRACT

A helical multiwire proportional chamber for detection of minimum ionizing particles consisting of an array of anode wires surrounded by a cathode wound in the form of a bifilar flattened helix nearly orthogonal to the anode wires and this chamber having an active area rectangular in shape, a frame comprising two pieces of plexiglass with a central cutout which forms the said active area, the anode wires being fastened to one of the frame pieces and the second frame piece being fastened to the first and the anode wires being connected in parallel to a positive high voltage supply and the cathode wire being connected to ground through a resistor.

1 Claim, 2 Drawing Figures

Patented July 3, 1973 3,743,840

BIFILAR HELICAL MULTIWIRE PROPORTIONAL CHAMBER

BACKGROUND OF THE INVENTION

The invention described herein was made in the course of, or under, a contract with the U. S. Atomic Energy Commission.

The multiwire proportional chamber has been developed into a useful position sensitive detector for medium and high energy physics applications. Such counters are particularly useful because of their high count rate capability ($\approx 10^6$ particles per second per wire), their good resolving time (30 nsec), their low mass, their high multitrack efficiency, and the fact that they are continuously active and do not require external trigger counters. For many purposes the type of chamber usually used, that is, with an amplifier on each anode wire, cannot achieve adequate spatial resolution. In such chambers the fwhm spatial resolution for particles incident normal to the chamber is very nearly equal to the wire spacing. The spatial resolution required in the focal plane detectors of many modern spectrometers is on the order of 0.25 mm fwhm. In this application it is possible to sacrifice high count rate capability and high multitrack efficiency in order to achieve the necessary resolution. In addition to reducing the wire spacing, two other methods have been used to obtain improved spatial resolution. One method was to measure the electron drift time to determine the initial location of the ion pairs. A best resolution of 0.47 mm fwhm is expected with this technique. The other method consists of capacitively coupling to a delay line readout the signal induced on the cathode. This technique has been highly developed and recent results with a $^{55}$Fe x-ray source indicate that 0.3 mm fwhm resolution is obtained. In addition to the excellent spatial resolution, the delay line technique has two important useful features. First, the fact that only two amplifiers are needed for one coordinate means that a large reduction in complexity and cost of readout electronics is achieved. Second, x-y readout from a single plane is possible which reduces the mass of the detector and makes possible two-dimensional readout of the location of low energy $\gamma$ rays. The disadvantages of this technique are that very small signals must be processed (0.1–1.0 mV for minimum ionizing particles and 2 mm anode wire spacing) and that the system is dead for as long as the signals are remembered by the delay line (2.5 $\mu$sec for a 35 cm line with 70 ns/cm delay). These properties make the chambers difficult to use under real experimental conditions.

SUMMARY OF THE INVENTION

The detectors of this invention consist of a bifilar helical cathode wound around a plane of anode wires. We have grounded one of the cathode windings at each turn. The resulting cathode can be described as being a parallel wire transmission line wound helically around the chamber. The pulses from the chamber are induced directly into the cathode without need for external coupling devices. This development gives us clean pulse response, large pulses, and good spatial resolution. This good resolution is critical to the performance of these detectors in their intended application, namely, in the focal plane of a spectrometer.

This transmission line has a large attenuation which makes it impractical to use an amplifier at each end of the line. Instead, we placed taps at the smaller (3.65 cm) intervals along the helix and placed an amplifier on each tap. The large number of taps creates a new problem, namely, there is a nonlinear response for events occurring too close to a tap. We have cured this problem by using electronics which ignores the signal from the tap nearest the event and uses the signals from the next nearest pair of taps instead.

The high attenuation and large number of amplifiers allows us to use the chamber at a high counting rate and to obtain good spatial resolution over the entire chamber. These developments have resulted in a practical high resolution detector which is useful in many application.

DESCRIPTION OF THE PREFERRED EMBODIMENT

Figure 1:
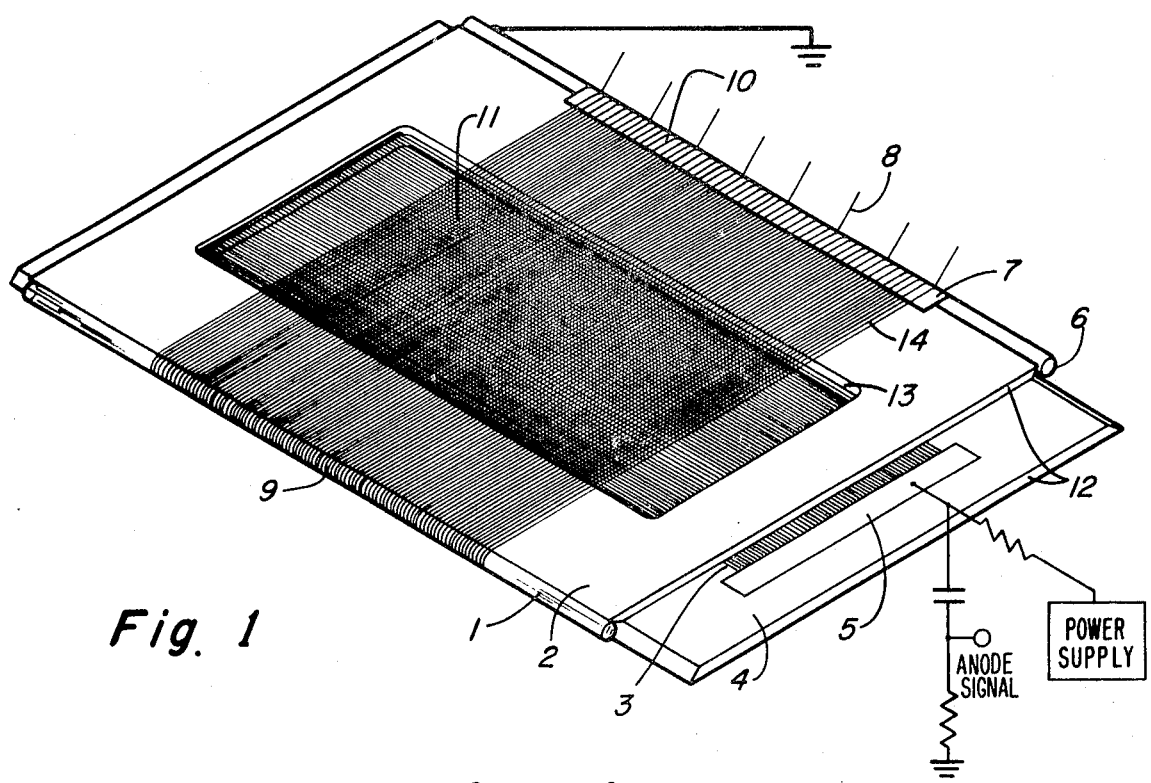
FIG. 1 is a perspective view of the chamber of this invention.

As shown in FIG. 1, a chamber 11 is constructed with an active area 13 of 10 cm × 25 cm. The supporting frame 12 is made from two sheets of polystyrene 2,4 each 20 cm × 40 cm × 0.32 cm with a central cutout 13 of approximately 12 cm × 25 cm. The anode wires 3 made from 20 $\mu$m diameter gold plated tungsten, are stretched on one piece of the frame 4 parallel to the long axis of the chamber, and with 2 mm spacing. These anode wires are soldered to a copper bus bar 5 fastened to said frame 4. Then the second frame member 2 is fastened on top of the first with anode wires sandwiched between. The cathode 9 is constructed by winding two separate helical windings each of 50 $\mu$m diameter copper wire. The first helix 14 is wound with 1 mm spacing and each turn is in electrical contact with a copper rod 6 placed along one edge of the frame before the winding is begun. Plastic rod 1 runs along the other and opposite edge of frame 2 over which are wound the cathode wires 9. Thin insulating tape 7 is then placed over the copper rod 6 and first winding 14. Then second winding 10 with 1 mm spacing is laid midway between the turns of the first winding 14. Because of the high attenuation of the helix, it is not possible to measure the signal at only the ends of the helix. Electrical taps 8 are connected to the helix at intervals of 3.65 cm, and signals are measured at these points. The small distance between the taps reduces the maximum delay before the signals are received. The large attenuation resulting from the low characteristic impedance results in a small memory time, hence a small dead time.

This chamber operates at $\approx$ 4000 V with a mixture of 50 percent argon—50 percent isobutane at a pressure of $\approx$ 1 atmosphere (560 mm Hg at the Los Alamos altitude of 2100 meters). The anode signal is coupled out with a 0.001 $\mu$f capacitor terminated in 2.2 k$\Omega$.

Electronics Design

Figure 2:
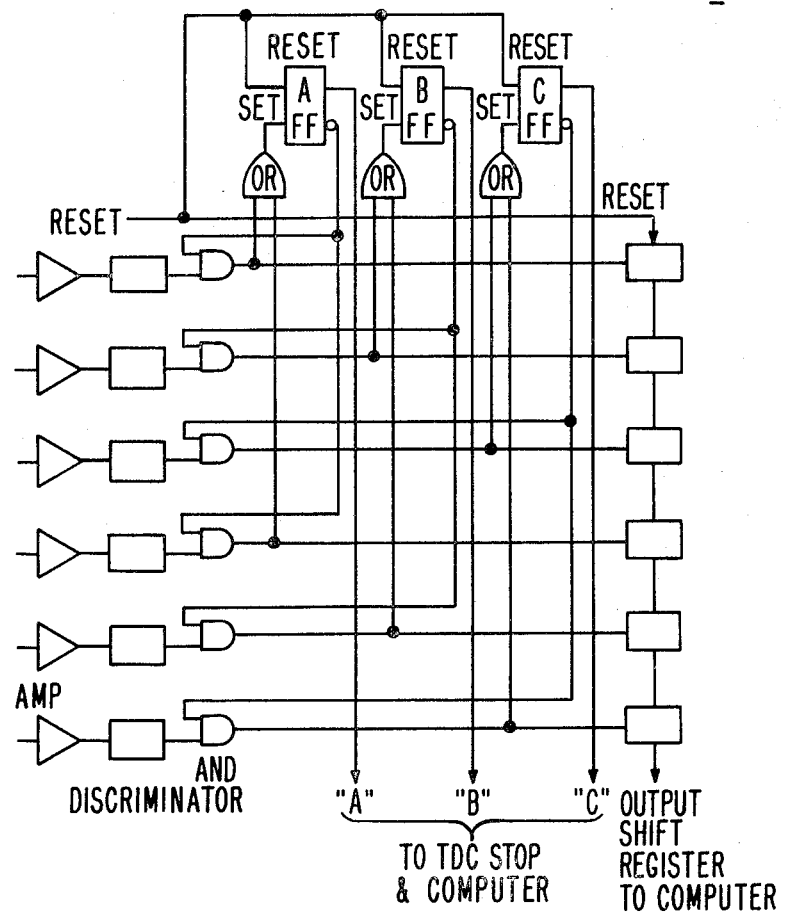
FIG. 2 is a schematic of the electronic system and operates in conjunction with the chamber of FIG. 1.

The electronics used with the chamber is shown in FIG. 2. The chamber has a helix length of approximately 30 cm which gives a maximum delay time of 500 nsec. Taps 8 are placed at 3.65 cm or approximately 70 ns intervals. Connected to each tap is an amplifier and discriminator circuit. Three time-to-digital converters (TDC) are started from the anode pulse.

The taps are divided into three groups which repeat cyclically along the helix. The amplifier-discriminator for each third tap will be "OR"ed together to stop the TDCs. A set of gates and flip-flops are used to record the first tap in each of the three groups which had a pulse for each event. The time measured by the three TDCs and the storage flip flops are read into a small digital computer. The computer program will then take the difference between the two largest times observed, thereby avoiding the difficulty with events occurring too close to a tap.

Operation of Device

A charged particle passing through the device creates ion pairs in the gas. The electrons are attracted to the vicinity of the anode and a multiplying avalanche occurs. The motion of the positive ions from this avalanche away from the anode induces a pulse in the cathode. The cathode comprises an electrical delay line. This induced pulse occurs close to the location of the original charged particle. By measuring the difference in arrival time of the induced pulse at two different locations on the transmission line, the location of the original charged particle is deduced.

What we claim is:

1. A proportional chamber capable of giving good resolution position readout comprising a plane of conducting anode wires surrounded by a bifilar helical cathode winding, said cathode having two separate helical windings, the first being wound around the said chamber over a grounded copper bar positioned along one edge of the frame and the second winding being wound midway between the turns of the first winding, insulated from the said copper bar and the signal from said chamber being tapped off the second winding, and connected to an amplifier-discriminator and digital computer means.

* * * * *